US010693836B2

(12) United States Patent
Lim et al.

(10) Patent No.: US 10,693,836 B2
(45) Date of Patent: Jun. 23, 2020

(54) DATA LOSS PREVENTION SYSTEM IMPLEMENTED ON CLOUD AND OPERATING METHOD THEREOF

(71) Applicant: SOMANSA CO., LTD., Seoul (KR)

(72) Inventors: Hwan Cheol Lim, Incheon (KR); Il Hoon Choi, Seoul (KR)

(73) Assignee: SOMANSA CO., LTD., Seoul (KR)

( * ) Notice: Subject to any disclaimer, the term of this patent is extended or adjusted under 35 U.S.C. 154(b) by 0 days.

(21) Appl. No.: 16/202,624

(22) Filed: Nov. 28, 2018

(65) Prior Publication Data

US 2020/0162420 A1 May 21, 2020

(30) Foreign Application Priority Data

Nov. 20, 2018 (KR) .......................... 10-2018-0143112

(51) Int. Cl.
*H04L 29/06* (2006.01)
*H04W 76/10* (2018.01)
(Continued)

(52) U.S. Cl.
CPC ........ *H04L 61/251* (2013.01); *G06F 21/6245* (2013.01); *H04L 61/2514* (2013.01);
(Continued)

(58) Field of Classification Search
CPC . H04L 61/251; H04L 63/029; H04L 61/2514; H04L 63/20; H04L 61/6059;
(Continued)

(56) References Cited

U.S. PATENT DOCUMENTS

2003/0149790 A1* 8/2003 Hwang ............. H04L 29/12358
709/245
2012/0110210 A1* 5/2012 Huang ................ H04L 61/2525
709/246
(Continued)

FOREIGN PATENT DOCUMENTS

KR 101855632 B1 5/2018

OTHER PUBLICATIONS

Network Working Group, "rfc 4193: Unique Local Ipv6 Unicast Addresses", Oct. 2005, 16 Pages. (Year: 2005).*

*Primary Examiner* — Arvin Eskandarnia
*Assistant Examiner* — Chhian (Amy) Ling
(74) *Attorney, Agent, or Firm* — Harness, Dickey & Pierce, P.L.C.

(57) ABSTRACT

Provided is a data loss prevention system comprising an address converting module for converting a private IP address of a received traffic into an IPv6 address; a first communication module for decoding the received traffic; the data loss analyzing module for analyzing the traffic transmitted from the first communication module according to a predetermined policy and examining whether personal information or confidential information is included; and a second communication module for transmitting the traffic transmitted from the data loss analyzing module to the address converting module after the traffic is encoded or not encoded according to the information representing whether the traffic is encoded included in the IPv6 address, wherein the address converting module restores the IPv6 address of the traffic transmitted from the second communication module to the private IP address.

10 Claims, 6 Drawing Sheets

(51) Int. Cl.
*H04L 29/08* (2006.01)
*H04M 3/42* (2006.01)
*H04M 7/00* (2006.01)
*H04L 29/12* (2006.01)
*G06F 21/62* (2013.01)

(52) U.S. Cl.
CPC ............ *H04L 63/029* (2013.01); *H04L 63/20* (2013.01); *H04L 61/6059* (2013.01)

(58) Field of Classification Search
CPC . H04L 65/1069; H04L 67/1031; H04L 67/42; H04L 69/40; H04L 67/141; H04L 67/02; H04L 67/146; G06F 21/6245; H04W 76/10; H04W 76/19; H04M 3/42119; H04M 3/42076; H04M 7/0075
See application file for complete search history.

(56) References Cited

U.S. PATENT DOCUMENTS

2013/0205035 A1* 8/2013 Chen .................. H04L 61/1511
709/230
2015/0100357 A1* 4/2015 Seese ................. G06Q 10/0631
705/7.12
2016/0344698 A1* 11/2016 Hastings ............. H04L 63/0245

* cited by examiner

DATA LOSS PREVENTION SYSTEM IMPLEMENTED ON CLOUD AND OPERATING METHOD THEREOF

CROSS-REFERENCE TO RELATED PATENT APPLICATION

This application claims the benefit of Korean Patent Application No. 10-2018-0143112, filed Nov. 20, 2018, in the Korean Intellectual Property Office, the disclosure of which is incorporated herein in its entirety by reference.

FIELD

The present invention relates to a data loss prevention system and a method of operating the system for preventing personal information or confidential information from leaking and more particularly, to a data loss prevention system and a method of operating the system implemented on cloud.

BACKGROUND

A data loss prevention system analyzes traffic of e-mails, messengers, and SNSs transmitted from the inside of companies or organizations to the outside and blocks the transmission if critical information such as personal information or confidential information is included, thereby preventing information leakage to the outside.

In general, a user (for example, companies or organizations) of the data loss prevention system (for example, companies or organizations) purchases a hardware form product and the data loss prevention system is provided by installing the purchased product to the user's network. However, although a current increase of the need, it was hard to introduce a personal data loss prevention system except for a large-scaled user who may afford the expense.

Therefore, in order to provide a data loss prevention system at a low cost, data loss prevention service in a Security As A Service (SECaaS) form, which uses a cloud environment, is introduced. Such a cloud-based data loss prevention service is useful in terms of costs, management, and easy distribution.

However, companies or organizations mostly use a private network and thereby, if private address band owned by each user's private network is overlapped with each other, a service provider hardly recognizes a user of a terminal which transmits corresponding traffic. Accordingly, in order to provide the cloud-based data loss prevention service, a service provider may separately establish a data loss prevention system for each user on cloud. Therefore, the cloud-based data loss prevention service is not still activated due to limitations of costs.

In regard to this, an applicant has introduced a data loss prevention system and a method in Korean Patent Registration No. 10-1855632 (2018 Apr. 30). Such system and method provide an information data loss prevention service to many users as a single system by classifying traffics transmitted from private networks of many users by each user, although private address band owned by each user's private network is overlapped with each other.

SUMMARY

A data loss prevention system disclosed in Korean Patent Registration No. 10-1855632 includes an address converter for receiving traffics from a private network using tunneling and converting a private IP address of the received traffic to an IPv6 address, which is unique in the data loss prevention system, and a data loss prevention unit for analyzing the traffic, in which the private IP address is converted to the IPv6 address, according to a predetermined policy and examining whether personal information or confidential information is included.

The data loss prevention unit, as a single module, decodes the traffic, if the traffic is encoded, analyzes the traffic, and performs operations (block transmitting and informing) according to analyzed results. When the analyzing is completed, the data loss prevention unit needs to encode the decoded traffic. As described above, in the single module, resources may not be efficiently allocated for each operation such as encoding, decoding, and analyzing. In particular, an amount of resources required in each operation may be flexibly changed according to properties of the traffic. For example, a large amount of resources may be required in encoding and decoding the traffic, whereas a smaller amount may be required in an analyzing the traffic. Also, encoding and decoding may not be required or a small amount of resources may be required in encoding and decoding, whereas a larger amount of resources may be required in analyzing the traffic. However, the data loss prevention unit formed as a single module may not be efficiently handle a change in an amount of resources required by each operation according to properties of the traffic.

The present invention provides a data loss prevention system and a method of operating the system which may efficiently handle a change in an amount of resources required by each operation such as encoding, decoding, and traffic analyzing.

According to an aspect of the present invention, there is provided a data loss prevention system implemented on cloud, the system including: an address converting module for converting a private IP address of a received traffic into an IPv6 address, which is unique in the data loss prevention system; a first communication module for decoding the received traffic, if the traffic is encoded, transmitting the decoded traffic to a data loss analyzing module and intactly transmitting the received traffic, if the received traffic is not encoded, to the data loss analyzing module by including information representing whether the traffic is encoded in the converted IPv6 address, which is unique in the data loss prevention system; the data loss analyzing module for analyzing the traffic transmitted from the first communication module according to a predetermined policy and examining whether personal information or confidential information is included; and a second communication module for transmitting the traffic transmitted from the data loss analyzing module to the address converting module after the traffic is encoded or not encoded according to the information representing whether the traffic is encoded included in the IPv6 address, wherein the address converting module restores the IPv6 address of the traffic transmitted from the second communication module to the private IP address.

The information representing whether the traffic is encoded may be included in prefix of an IPv6 address space.

The prefix may correspond to upper 48 bit of the IPv6 address space.

The IPv6 address, which is unique, may include a unique identifier of a private network, in which the private IP address is included, and the unique identifier and the information representing whether the traffic is encoded may be included in prefix of an IPv6 address space.

The unique identifier may be included in a part of bits except for predetermined upper bits in the prefix and the information representing whether the traffic is encoded may be included in other part of bits from among the remaining bits.

The received traffic may be from a private network and the address converting module may convert the restored private IP address to a public IP address and transmit the traffic through the internet. The received traffic may be from the internet and the address converting module may transmit the restored private IP address to a private network.

According to another aspect of the present invention, there is provided a method of operating the data loss prevention system implemented on cloud, wherein the system includes a data loss analyzing module for analyzing traffic according to a predetermined policy and examining whether personal information or confidential information is included, the method including: converting a private IP address of a received traffic into an IPv6 address, which is unique in the data loss prevention system; decoding the received traffic, if the traffic is encoded, transmitting the decoded traffic to the data loss analyzing module and intactly transmitting the received traffic, if the received traffic is not encoded, to the data loss analyzing module by including information representing whether the traffic is encoded in the converted IPv6 address, which is unique in the data loss prevention system; analyzing the transmitted traffic transmitted according to a predetermined policy and examining whether personal information or confidential information is included by the data loss analyzing module; encoding or not encoding the traffic transmitted from the data loss analyzing module according to the information representing whether the traffic is encoded included in the IPv6 address; and restoring the IPv6 address of the encoded or non-encoded traffic into the private IP address.

The received traffic may be from a private and the method may further include converting the restored private IP address to a public IP address and transmitting the traffic through the internet. The received traffic may be from the internet and the method may further include transmitting the restored private IP address to a private network.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
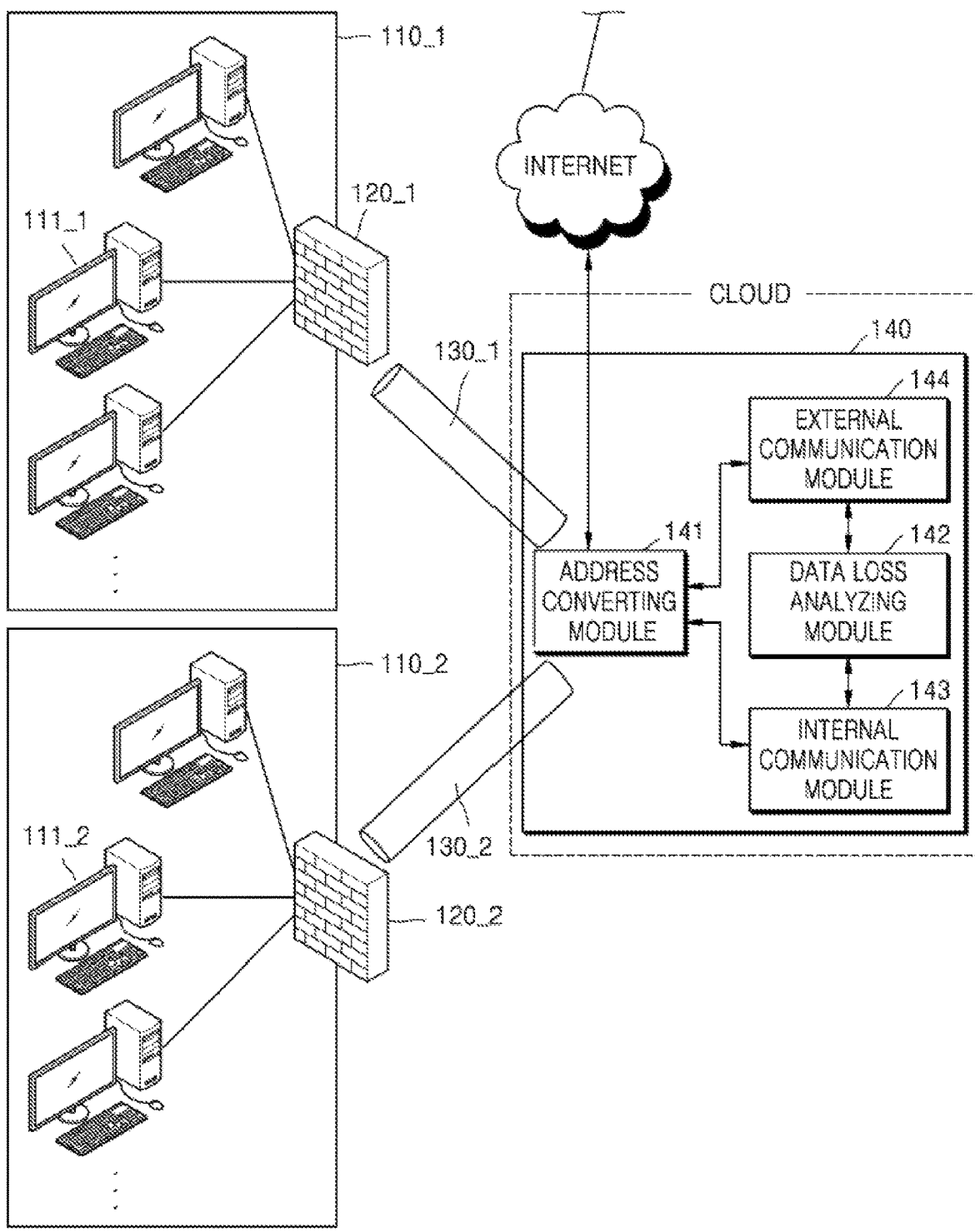
FIG. 1 illustrates a data loss prevention system according to an embodiment of the present invention.

Hereinafter, the present invention will be described more fully with reference to the accompanying drawings, in which exemplary embodiments of the invention are shown. Like reference numerals in the description below and drawings denote like elements. In the description, the detailed descriptions of well-known technologies and structures may be omitted so as not to hinder the understanding of the present invention.

FIG. 1 illustrates a data loss prevention system 140 according to an embodiment of the present invention.

The data loss prevention system 140 is implemented on cloud and is connected to each private network used by a plurality of users through IP tunnels (for example, GRE and IPsec). For example, as illustrated in the drawing, the data loss prevention system 140 is connected to a first firewall 120_1 installed to a first private network 110_1 of a first user through a first IP tunnel 130_1 and is connected to a second firewall 120_2 installed to a second private network 110_2 of a second user through a second IP tunnel 130_2. Also, the data loss prevention system 140 is connected to an internet network.

When traffic is received from a first terminal 111_1 of the first private network 110_1 through the first IP tunnel 130_1, the data loss prevention system 140 analyzes the received traffic according to a predetermined policy, examines whether personal information or confidential information is included, converts a source private IP address into a public IP address, and transmits the converted address to a destination through the internet. Also, when the traffic is received through the internet, the data loss prevention system 140 converts the destination public IP address of the traffic into a private IP address, analyzes the traffic according to a predetermined policy, examines whether personal information or confidential information is included, and transmits the traffic to the first private network 110_1 through the first IP tunnel 130_1.

In the same manner, when traffic is received from a second terminal 111_2 of the second private network 110_2 through the second IP tunnel 130_2, the data loss prevention system 140 analyzes the received traffic according to a predetermined policy, examines whether personal information or confidential information is included, converts a source private IP address into a public IP address, and transmits the converted address to a destination through the internet. Also, when the traffic is received through the internet, the data loss prevention system 140 converts the destination public IP address of the traffic into a private IP address, analyzes the traffic according to a predetermined policy, examines whether personal information or confidential information is included, and transmits the traffic to the second private network 110_2 through the second IP tunnel 130_2.

Hereinafter, a private network 110 denotes the first private network 110_1, the second private network 110_2, or another non-illustrated private network, and a terminal 111 denotes the first terminal 111_1, the second terminal 111_2, or another non-illustrated terminal in the other private network.

The data loss prevention system 140 according the embodiment of the present invention includes an address converting module 141, a data loss analyzing module 142, an internal communication module 143, and an external communication module 144.

The address converting module 141 aggregates the received traffic, converts a private IP address of the received traffic into an IPv6 address, which is unique in the data loss prevention system 140 so as to easily classify the traffic transmitted from private networks of various users by each user, and transmits the traffic to the internal communication module 143 (when the traffic is received from a private network) or the external communication module 144 (when the traffic is received from the internet).

In order to convert a private IP address of the traffic into an IPv6 address, which is unique, the address converting module 141 may convert the private IP address of the traffic into an IPv6 address including a unique identifier allocated to a private network which transmits the corresponding traffic (or a destination of the corresponding traffic). For example, a unique identifier is respectively allocated to the first private network 110_1 and the second private network 110_2. Accordingly, the address converting module 141 may convert a private IP address of the traffic of the first private network 110_1 into an IPv6 address including a unique identifier of the first private network 110_1 and may convert a private IP address of the traffic of the second private network 110_2 into an IPv6 address including a unique identifier of the second private network 110_2.

The internal communication module 143 is responsible for communicating with a user, that is, the private network 110, and encoding and decoding for the communication. That is, when the traffic received from the private network 110 is encoded, the internal communication module 143 decodes the encoded traffic, transmits the decoded traffic to the data loss analyzing module 142, encodes the traffic, which needs to be encoded and transmitted to the private network 110, and transmits the encoded traffic to the address converting module 141.

The external communication module 144 is responsible for communicating with the internet and encoding and decoding for the communication. That is, when traffic received from the internet is encoded, the external communication module 144 decodes the encoded traffic, transmits the decoded traffic to the data loss analyzing module 142, encodes the traffic, which needs to be encoded and transmitted to the internet, and transmits the encoded traffic to the address converting module 141.

The data loss analyzing module 142 analyzes the decoded traffic (or traffic that is not originally encoded) transmitted from the internal communication module 143 or the external communication module 144 according to a predetermined policy (or a policy predetermined by each user) and examines whether personal information or confidential information is included. Then, if personal information or confidential information is included according to the analyzed result of the traffic, the data loss analyzing module 142 blocks such traffic from being transmitted and sends a block message informing that the traffic is blocked due to concern about data loss to the terminal 111 or a network manager of a user, if needed.

Since the data loss analyzing module 142 receives the traffic with the IPv6 address including a unique identifier allocated to a private network, the data loss analyzing module 142 may recognize where the terminal 111, which generates such traffic, is included from among the users, that is, the private networks, even if private address band owned by the private networks of each user is overlapped with each other. Accordingly, the data loss analyzing module 142 may analyze the traffic according to a policy set by each user and control the traffic by each user.

According to an embodiment of the present invention, the data loss prevention system 140 includes four modules including the address converting module 141, the data loss analyzing module 142, the internal communication module 143, and the external communication module 144. These modules may respectively operate as an independent system. Here, the independent system denotes a single system or a single instance which may be implemented on cloud and may include all tools for separate operation and maintenance for each system.

According to an embodiment of the present invention, as the data loss prevention system 140 includes four modules, resources may be separately allocated to each module. For example, when a large amount of resources are required in encoding and decoding according to a property of the traffic or conditions, more resources may be allocated to the internal communication module 143 and the external communication module 144. Also, when a large amount of resources are required in an analyzing process, more resources may be allocated to the data loss analyzing module 142.

As described above, when the data loss prevention system 140 is operated by each module, resources may be efficiently used. However, it is required that modules share properties of the traffic. For example, the external communication module 144 needs to communicate with an external server existing on the internet by using the data transmitted from the internal communication module 143 and the data loss analyzing module 142 and here, it is hard for the external communication module 144 to independently judge whether encoding is applied. Accordingly, the external communication module 144 needs to share information about properties of the traffic informing whether the traffic is encoded with the internal communication module 143. However, if a separate system for sharing such information is adopted, costs and complexity of the entire system greatly increase and thereby, an increase in a load may be greater than improved efficiency obtained by separating each module.

In the embodiment of the present invention, the address converting module 141 converts a private IP address of the traffic into an IPv6 address including a unique identifier of the corresponding private network, as in Korean Patent Registration No. 10-1855632. Furthermore, in the embodiment of the present invention, information about properties of the traffic informing whether the traffic is encoded is included in the converted IPv6 address and thus, each module of the data loss prevention system 140 may simply and efficiently share the information about properties of the traffic without separate information sharing means. Hereinafter, an address converting process will be described in more detail.

According to an IPv6 address system, upper 48 bit or more may be used as prefix from among an address space of 128 bit. Thus, a range, which may be used as an internal address, is 80 bit at the most and is enough, considering that current users mostly use an IPv4 address system.

In addition, at a RFC 4193 standard, fc00::/7 band, that is, an address band, in which upper 7 bit has "1111110", is determined as a unique local address and thus, may be used as a private IP band. Also, there is a possibility that fec0::/10 band that is not used in a RFC 3879 standard any longer may be used as a private IP band.

According to Korean Patent Registration No. 10-1855632, a unique identifier that corresponds to a user, that is, a private network, is included in prefix of upper 48 bit, in order to generate a unique address in the data loss prevention system 140. Thus, the private networks are classified and fc00::/7 band or fec0::/10 band is used as an address band. When fc00::/7 band is used, 41 bit, in which 7 bit is excepted from 48 bit, may be used as a domain for a unique identifier of a private network. When fec0::/10 band is used, 38 bit, in which 10 bit is excepted from 48 bit, may be used as a domain for a unique identifier of a private network. As such, when 41 bit or 38 bit is used as a domain for a unique identifier, the number of allocable unique identifiers is 241 or 238 and such number is excessively larger than the practically acceptable number of users.

However, in the embodiment of the present invention, 41 bit, in which upper 7 bit is excepted from upper 48 bit, or 38 bit, in which upper 10 bit is excepted from upper 48 bit, in an IPv6 address is not used as a domain for a unique identifier. Instead, a part of 41 bit or 38 bit is used as a domain for a unique identifier and the remaining part is used as a domain representing information about properties of the corresponding traffic informing whether the traffic is encoded. For example, upper 33 bit of 41 bit may be used as a domain for a unique identifier and lower 8 bit of 41 bit may be used as a domain informing information about properties of the corresponding traffic. Although only 1 bit is enough to inform whether the traffic is encoded or decoded, 8 bit may be defined as a domain so that other information, which may need to be shared with modules, may be additionally included. In this case, since the number of allocable unique identifiers for classifying private networks is reduced from 241 to 233, the number represented by 33 bit is 233=8,589,934,592 and about eight hundred and fifty million private networks may be classified. Such number is still excessively larger than the practically acceptable number of users.

Figure 2:
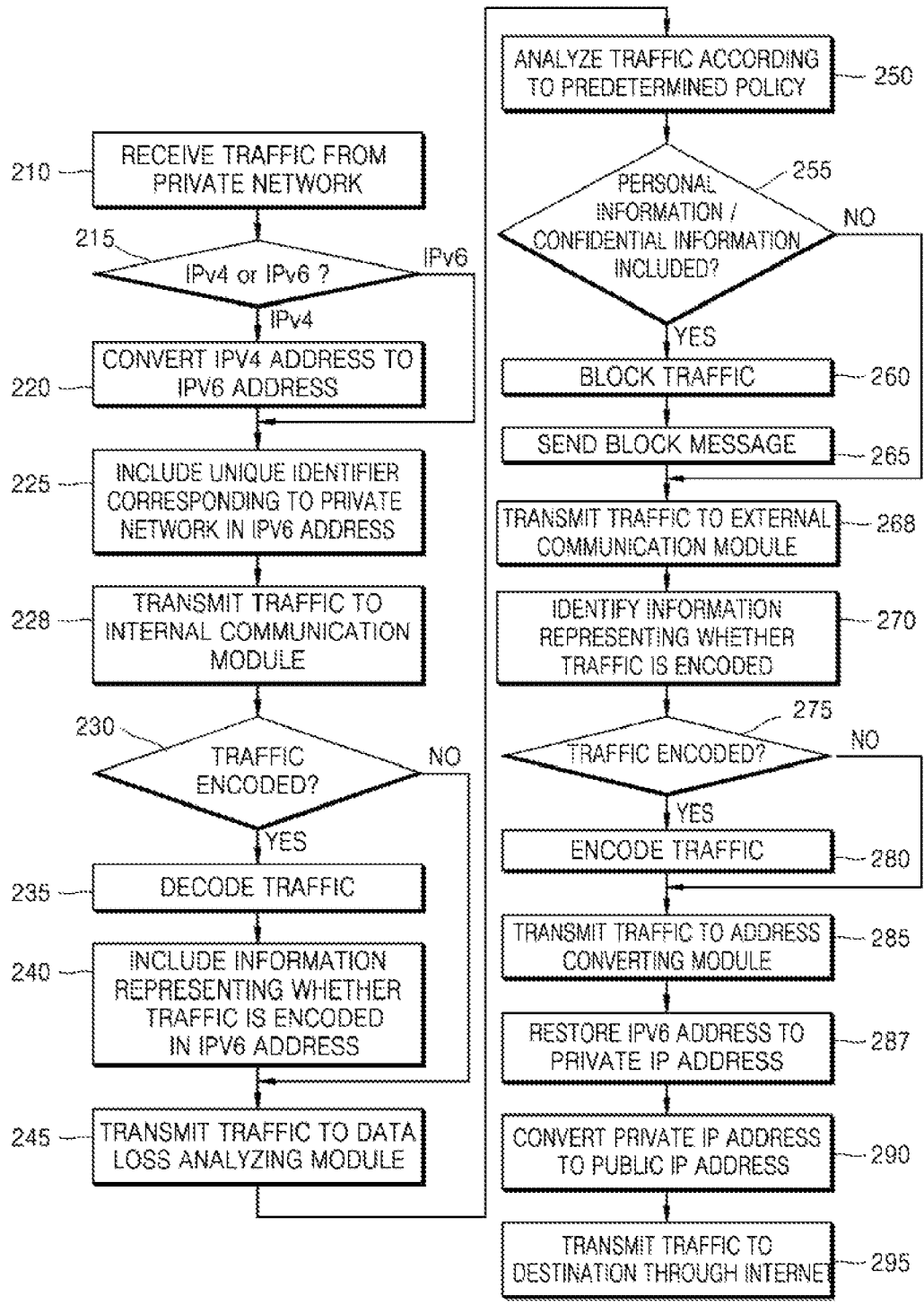
FIG. 2 is a flowchart illustrating receiving traffic from a private network and transmitting the traffic through the internet in a method of operating the data loss prevention system of FIG. 1 according to an embodiment of the present invention.

FIG. 2 is a flowchart illustrating receiving traffic from a private network and transmitting the traffic through the internet in a method of operating the data loss prevention system 140 according to an embodiment of the present invention.

In operation 210, the address converting module 141 receives traffic of the terminal 111 from the private network 110.

Next operations 215 through 225 illustrate converting a private IP address of the traffic to an IPv6 address, which is unique in the data loss prevention system 140.

In operation 215, the address converting module 141 identifies whether the private IP address of the received traffic is an IPv4 address or an IPv6 address.

When in the IPv4 address, the address converting module 141 converts the IPv4 address of the traffic to the IPv6 address, in operation 220. Here, such a conversion may be realized according to a predefined address conversion system. For example, in a typical address conversion system, first 80 bit of the IPv6 address is set to 0, next 16 bit is set to 1, and then the IPv4 address is recorded to remaining 32 bit.

Next, in operation 225, the address converting module 141 includes a unique identifier that corresponds to the private network, which transmits the traffic, in the converted IPv6 address. As described above, the unique identifier may be included in upper 33 bit in 41 bit, in which upper 7 bit is excepted from upper 48 bit, in the IPv6 address space.

For example, when a unique identifier of the first private network 110_1 is '1' and the private address band is 192.168.0.0/24 (that is, 192.168.0.0~192.168.0.255), 192.168.0.0/24 band is converted to ::ffff:C0A8:0000/120 band (that is, ::ffff:C0A8:0000~::ffff:C0A8:00ff), in operation 220. In operation 225, when the unique identifier 1 of the first private network 110_1 is included in upper 33 bit in 41 bit, in which upper 7 bit is excepted from upper 48 bit, ::ffff:C0A8:0000/120 band is converted to fc00:0000:0100::/120 band. Here, "ffff" appeared by IPv4 IPv6 conversion and "C0A8:00" that corresponds to "192.168.0", which is upper 24 bit of 192.168.0.0/24 band are all substituted with 0 due to meaninglessness in classifying an address. Both parts may be substituted with an arbitrary value or may leave without change.

For example, when a unique identifier of the second private network 110_2 is '2' and the private address band is 192.168.0.0/24, which is same as in the first private network 110_1, 192.168.0.0/24 band is converted to ::ffff:C0A8:0000/120 band, as in the first private network 110_1, in operation 220. In operation 225, when the unique identifier 2 of the second private network 110_2 is included in upper 33 bit in 41 bit, in which upper 7 bit is excepted from upper 48 bit, ::ffff:C0A8:0000/120 band is converted to fc00:0000:0200::/120 band.

As described above, the private address band of the first private network 110_1 and the second private network 110_2 is 192.168.0.0/24, which is the same. However, since a unique identifier of each private network is included in the converted IPv6 address, the address bands of the first private network 110_1 and the second private network 110_2 in the data loss prevention system 140 are respectively fc00:0000:0100::/120 and fc00:0000:0200::/120, which are different from each other, and thus, may not conflict with each other.

When it is identified that the private IP address of the received traffic is the IPv6 address, in operation 215, operation 225 is performed so that the address converting module 141 includes a unique identifier that corresponds to the private network, which transmits such traffic, in the IPv6 address of such traffic. Also, in this case, the unique identifier may be included in upper 33 bit in 41 bit, in which upper 7 bit is excepted from upper 48 bit, in the IPv6 address space.

In operation 228, the address converting module 141 transmits the traffic including the unique identifier in the IPv6 address to the internal communication module 143.

In operation 230, the internal communication module 143 identifies whether the traffic is encoded and when it is identified that the traffic is encoded, operation 235 is performed to decode the traffic and to obtain plain text data. Then, in operation 240, the internal communication module 143 adds information representing that the traffic is encoded (that is, the encoded traffic is decoded) to the IPv6 address. As described above, when the information representing whether the traffic is encoded is represented by using lower 8 bit in 41 bit, in which upper 7 bit is excepted from upper 48 bit, in the IPv6 address space, the encoded traffic and non-encoded traffic are respectively represented by '1' and '0' (the opposite way is also possible) and '1' or '0' may be included in above 8 bit.

When the IPv6 address of fc00:0000:0100::/120 band including the unique identifier of 1 is generated in operation 225 and '1' is included in lower 8 bit in 41 bit, in which upper 7 bit is excepted from upper 48 bit, in the IPv6 address space, fc00:0000:0100::/120 band is converted to fc00:0000:0101::/120 band.

In operation 245, the internal communication module 143 transmits the traffic, in which information representing that the traffic is encoded is added to the IPv6 address, to the data loss analyzing module 142.

In operation 230, when it is identified that the traffic is not encoded, operation 245 is performed without a decoding process and the internal communication module 143 intactly transmits the traffic, that is, plain text form traffic, to the data loss analyzing module 142. Here, information representing that the traffic is not encoded may be 'added' as the information informing whether the traffic is encoded. However, when the traffic is not encoded and it is represented by '0', the IPv6 address converted in operation 225 maintains and thereby, the traffic may be represented as non-encoded traffic by the corresponding bit. For example, when the IPv6 address of fc00:0000:0100::/120 band including the unique identifier of 1 is generated in operation 225, lower 8 bit in 41 bit, in which upper 7 bit is excepted from upper 48 bit, in the IPv6 address space is '0' and thus, the above 8 bit represents that the traffic is not encoded.

In operation 250, the data loss analyzing module 142 analyzes the traffic transmitted from the internal communication module 143, that is, the traffic decoded by the internal communication module 143 after being received as the encoded traffic, or the plain text traffic, according to a predetermined policy.

In operation 255, when it is determined that personal information or confidential information is included in the traffic according to the analyzed result, the data loss analyzing module 142 blocks the traffic from being transmitted to the outside, in operation 260 and sends a block message informing that the traffic is blocked due to concern about information leakage to the terminal 111, which generates the traffic, or a network manager of a user, if needed, in operation 265.

In operation 255, when it is determined that personal information or confidential information is not included in the traffic according to the analyzed result, the data loss analyzing module 142 transmits the traffic to the external communication module 144 in operation 268.

In operation 270, the external communication module 144 identifies information representing whether the traffic is encoded in the IPv6 address of the plain text form traffic transmitted from the data loss analyzing module 142. For example, the external communication module 144 may identify the information representing whether the traffic is encoded through lower 8 bit in 41 bit, in which upper 7 bit is excepted from upper 48 bit, in the IPv6 address space. When a value of the last bit of the 8 bit is '1', the external communication module 144 determines that the traffic is encoded (that is, the traffic to be encoded). When a value of the last bit of the 8 bit is '0', the external communication module 144 determines that the traffic is not encoded.

When it is identified that the traffic is encoded, in operation 275, the external communication module 144 encodes the traffic transmitted from the data loss analyzing module 142 in operation 280 and performs a process for transmitting the encoded traffic to a destination.

When it is identified that the traffic is not encoded, in operation 275, the external communication module 144 does not encode the traffic transmitted from the data loss analyzing module 142 and performs a process for transmitting a plain text traffic to a destination.

In operation 285, the external communication module 144 transmits the encoded traffic or the plain text traffic to the address converting module 141. Here, the external communication module 144 may transmit the traffic to the address converting module 141 after removing the information about properties of the traffic added in the IPv6 address.

In operation 287, the address converting module 141 restores the IPv6 address of the traffic transmitted from the external communication module 144 to an original private IP address. Such process may be performed by inversely performing the conversion through operations 220 and 225 (operation 225 in case of a private IPv6 address).

The address converting module 141 converts a private IP address of the traffic to a public IP address in operation 290 and transmits the traffic with the converted public IP address to a destination through the internet in operation 295.

Figure 3:
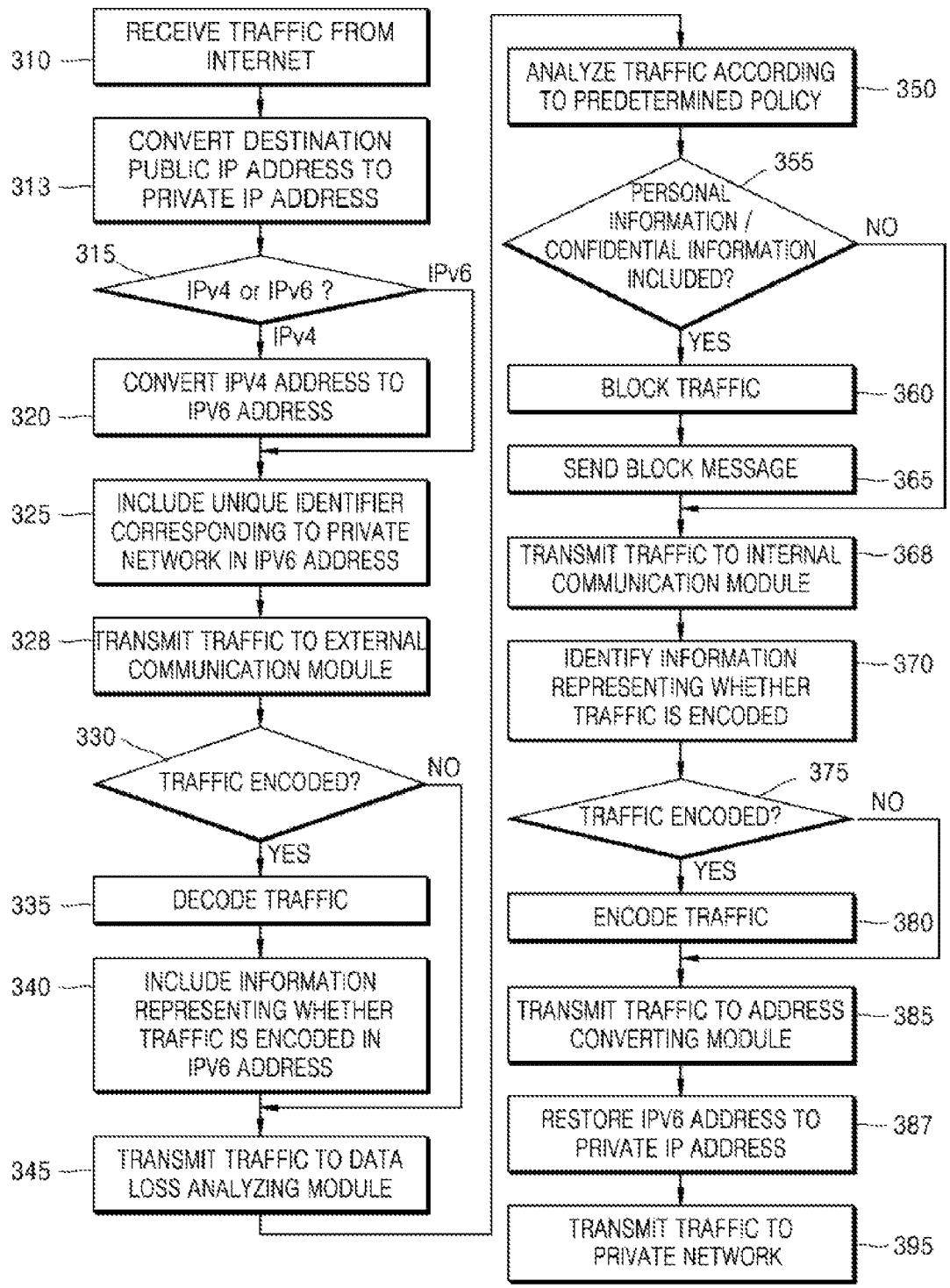
FIG. 3 is a flowchart illustrating receiving traffic from the internet and transmitting the traffic to a private network in a method of operating the data loss prevention system of FIG. 1 according to an embodiment of the present invention.

FIG. 3 is a flowchart illustrating receiving traffic from the internet and transmitting the traffic to a private network in a method of operating the data loss prevention system 140 according to an embodiment of the present invention. Here, detailed description of processes in FIG. 3 overlapped with the processes in FIG. 2 will be omitted.

In operation 310, the address converting module 141 receives traffic from the internet.

In operation 313, the address converting module 141 converts a destination public IP address of the traffic to a private IP address.

Next operations 315 through 325 illustrate converting a destination private IP address of the traffic to an IPv6 address, which is unique in the data loss prevention system 140.

In operation 315, the address converting module 141 identifies whether the private IP address of the received traffic is an IPv4 address or an IPv6 address.

When in the IPv4 address, the address converting module 141 converts the IPv4 address of the traffic to the IPv6 address, in operation 320.

Next, in operation 325, the address converting module 141 includes a unique identifier that corresponds to the private network, which transmits the traffic, in the converted IPv6 address.

When it is identified that the private IP address of the received traffic is the IPv6 address, in operation 315, operation 325 is performed so that the address converting module 141 includes a unique identifier that corresponds to the private network, to which such traffic is to be transmitted, in the IPv6 address of such traffic.

In operation 328, the address converting module 141 transmits the traffic including the unique identifier in the IPv6 address to the external communication module 144.

In operation 330, the external communication module 144 identifies whether the traffic is encoded and when it is identified that the traffic is encoded, operation 335 is performed to decode the traffic and to obtain plain text data. Then, in operation 340, the external communication module 144 adds information representing that the traffic is encoded (that is, the encoded traffic is decoded) to the IPv6 address.

In operation 345, the external communication module 144 transmits the traffic, in which information representing that the traffic is encoded is added to the IPv6 address, to the data loss analyzing module 142.

In operation 330, when it is identified that the traffic is not encoded, operation 345 is performed without a decoding process and the external communication module 144 intactly transmits the traffic, that is, plain text form traffic, to the data loss analyzing module 142.

In operation 350, the data loss analyzing module 142 analyzes the traffic transmitted from the external communication module 144, that is, the traffic decoded by the external communication module 144 after being received as the encoded traffic, or the plain text traffic, according to a predetermined policy.

In operation 355, when it is determined that personal information or confidential information is included in the traffic according to the analyzed result, the data loss analyzing module 142 blocks the traffic from being transmitted to the private network, in operation 360 and sends a block message informing that the traffic is blocked due to concern about information leakage to the terminal 111, to which the traffic is to be transmitted, or a network manager of a user, if needed, in operation 365.

In operation 355, when it is determined that personal information or confidential information is not included in the traffic according to the analyzed result, the data loss analyzing module 142 transmits the traffic to the internal communication module 143 in operation 368.

In operation 370, the internal communication module 143 identifies information representing whether the traffic is encoded in the IPv6 address of the traffic transmitted from the data loss analyzing module 142.

When it is identified that the traffic is encoded, in operation 375, the internal communication module 143 encodes the traffic transmitted from the data loss analyzing module 142 in operation 380 and performs a process for transmitting the encoded traffic to a destination.

When it is identified that the traffic is not encoded, in operation 375, the internal communication module 143 does not encode the traffic transmitted from the data loss analyzing module 142 and performs a process for transmitting a plain text traffic to a destination.

In operation 385, the internal communication module 143 transmits the encoded traffic or the plain text traffic to the address converting module 141. Here, the internal communication module 143 may transmit the traffic to the address converting module 141 after removing the information about properties of the traffic added to the IPv6 address.

In operation 387, the address converting module 141 restores the IPv6 address of the traffic transmitted from the internal communication module 143 to an original private IP address.

In operation 395, the address converting module 141 transmits the traffic to a private network including the private IP address.

Figure 4A:
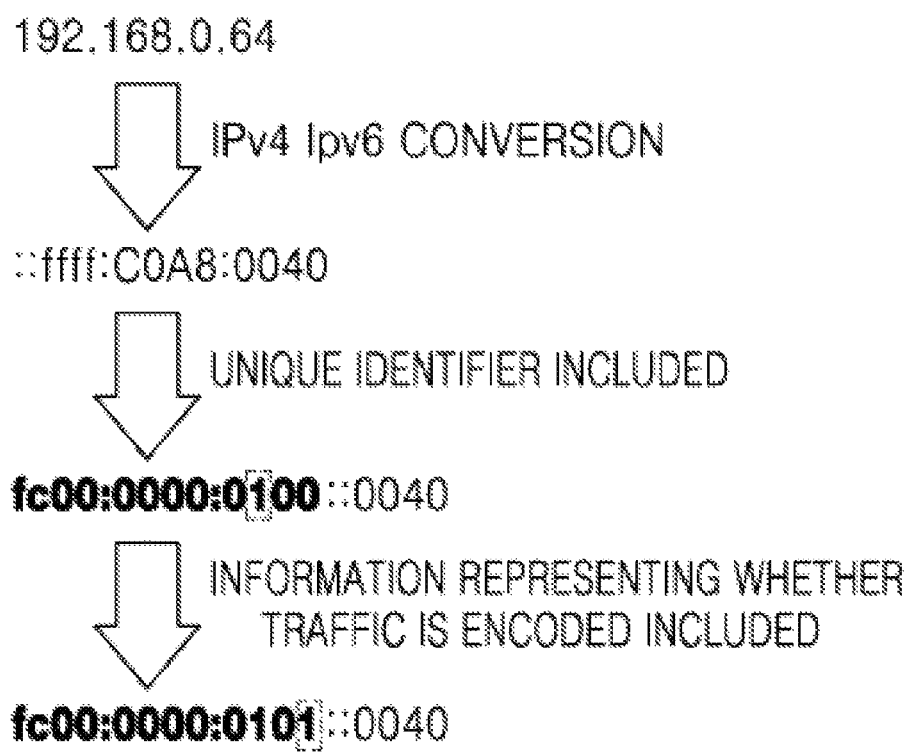
FIG. 4A illustrates an example of a process in which an IPv4 address of a private network is converted to an IPv6 address, which is unique in the data loss prevention system of FIG. 1, and then, information representing whether traffic is encoded is included.

FIG. 4A illustrates an example of a process in which an IPv4 address of a private network is converted to an IPv6 address, which is unique in the data loss prevention system 140, and then, information representing whether traffic is encoded is included.

Referring to FIG. 4A, '192.168.0.64', which is the IPv4 address, is converted to '::ffff:C0A8:0040', which is the IPv6 address, through IPv4 IPv6 conversion. Then, 'ffff:C0A8:00' in '::ffff:C0A8:0040' is all substituted with 0 and prefix 'fc00:0000:0100' including the unique identifier '1' of the first private network 110_1 is combined therewith. Therefore, the IPv6 address is converted to 'fc00:0000:0100::0040'. Then, the information '1' representing the encoded traffic is added to the prefix 'fc00:0000:0100' and thereby, it may be represented by the IPv6 address of 'fc00:0000:0101::0040' that the traffic is from the first private network 110_1 and is encoded.

Figure 4B:
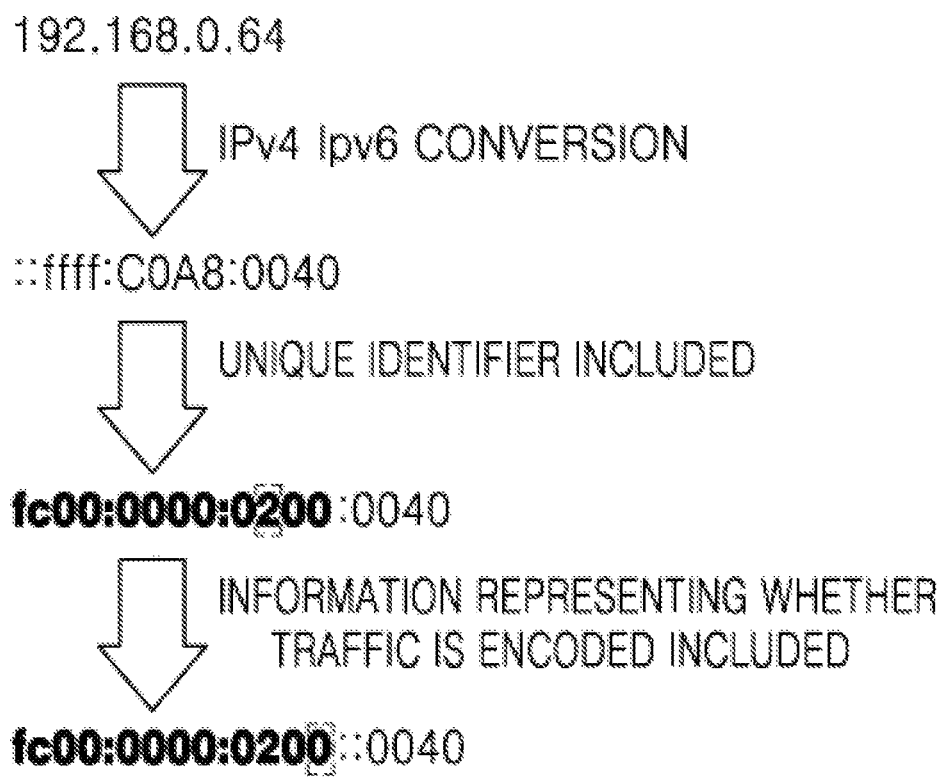
FIG. 4B illustrates another example of a process in which an IPv4 address of a private network is converted to an IPv6 address, which is unique in the data loss prevention system of FIG. 1, and then, information representing whether traffic is encoded is included.

FIG. 4B illustrates another example of a process in which an IPv4 address of a private network is converted to an IPv6 address, which is unique in the data loss prevention system 140, and then, information representing whether traffic is encoded is included.

Referring to FIG. 4B, '192.168.0.64', which is the IPv4 address, is converted to '::ffff:C0A8:0040', which is the IPv6 address, through IPv4 IPv6 conversion. Then, "ffff:C0A8:00" in '::ffff:C0A8:0040' is all substituted with 0 and prefix 'fc00:0000:0200' including the unique identolkgsrjiweipotkyjrus7a8Z (iruifier '2' of the second private network 110_2 is combined therewith. Therefore, the IPv6 address is converted to 'fc00:0000:0200::0040'. Then, the information '0' representing the encoded traffic maintains in prefix 'fc00:0000:0200' and thereby, it may be represented by the IPv6 address of 'fc00:0000:0200::0040' that the traffic is from the second private network 110_2 and is not encoded.

Figure 4C:
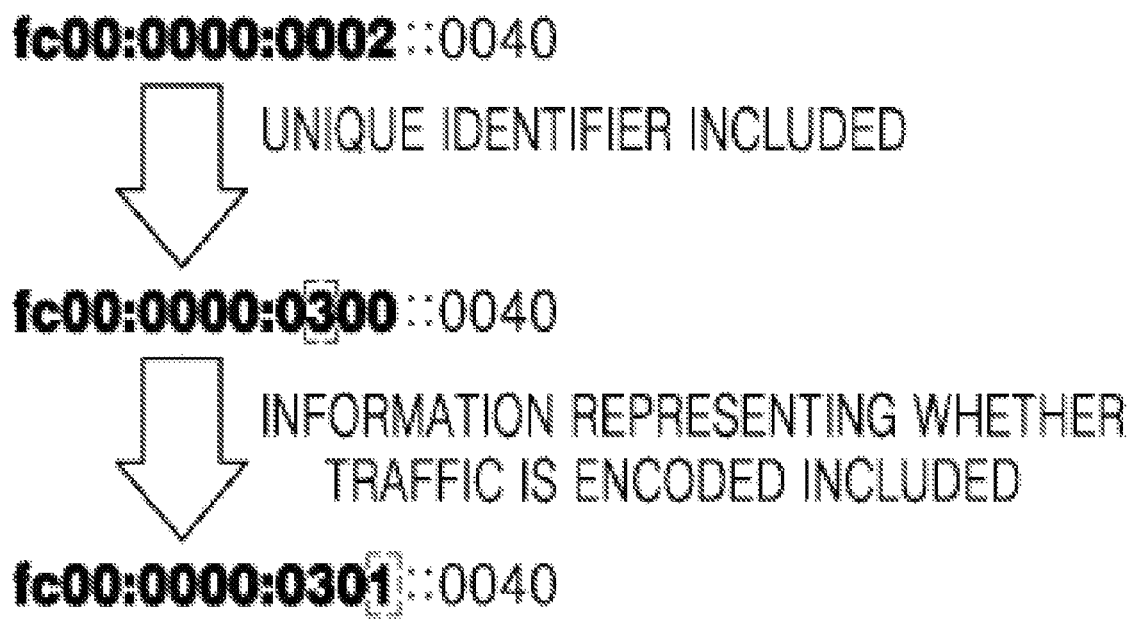
FIG. 4C illustrates another example of a process in which an IPv6 address of a private network is converted to an IPv6 address, which is unique in the data loss prevention system of FIG. 1, and then, information representing whether traffic is encoded is included.

FIG. 4C illustrates another example of a process in which an IPv6 address of a private network is converted to an IPv6 address, which is unique in the data loss prevention system 140, and then, information representing whether traffic is encoded is included.

Referring to FIG. 4C, 'fc00:0000:0002::0040', which is the private IPv6 address, is converted to 'fc00:0000:0300::0040' after prefix 'fc00:0000:0300' including the unique identifier '3' of a third private network, instead of prefix "fc00:0000:0002" of the third private network, is combined with the internal address '::0040'. Then, the information '1' representing the encoded traffic is added to the prefix 'fc00:0000:0300' and thereby, it may be represented by the IPv6 address of 'fc00:0000:0301::0040' that the traffic is from the third private network and is encoded.

According to the present invention, resources may be allocated by each operation such as encoding, decoding and traffic analyzing in the data loss prevention system and thus, efficiency of the system may be improved. Also, since the information representing whether traffic is encoded is included in the IPv6 address, which is unique in the data loss prevention system, the information may be simply and efficiently shared with modules without a separate information sharing means.

The device described herein may comprise a processor, a memory for storing program data and executing it, a permanent storage such as a disk drive, a communications port for handling communications with external devices, and user interface devices, including a touch panel, keys, buttons, etc. When software modules or algorithms are involved, these software modules may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data loss prevention system implemented on a cloud, the system comprising:
    an address converting module for converting a private IP address of a received traffic into an IPv6 address, which is unique in the data loss prevention system;
    a first communication module for decoding the received traffic and transmitting the decoded traffic to a data loss analyzing module when the received traffic is encoded, and intactly transmitting the received traffic to the data loss analyzing module when the received traffic is not encoded, by including information in the converted IPv6 address of the traffic to be transmitted to the data loss analyzing module representing whether the traffic to be transmitted is the decoded traffic or the received intact traffic;
    the data loss analyzing module for analyzing the traffic transmitted from the first communication module according to a predetermined policy, examining whether personal information or confidential information is included and transmitting the examined traffic to a second communication module; and
    the second communication module for transmitting the traffic transmitted from the data loss analyzing module to the address converting module wherein the second communication module identifies the information included in the converted IPv6 address, the second communication module encodes the traffic transmitted from the data loss analyzing module and transmits the encoded traffic to the address converting module when the information in the converted IPv6 address represents that the traffic is the decoded traffic from the received encoded traffic, and the second communication module transmits intactly the traffic transmitted from the data loss analyzing module to the address converting module when the information in the converted IPv6 address represents that the traffic is the received intact traffic,
    wherein the address converting module restores the IPv6 address of the traffic transmitted from the second communication module to the private IP address, and
    wherein the unique IPv6 address comprises a unique identifier of a private network in which the private IP address is included, and the unique identifier and the information representing whether the traffic is encoded are included in a prefix of an IPv6 address space.

2. The system of claim 1, wherein the prefix corresponds to an upper 48 bit of the IPv6 address space.

3. The system of claim 1, wherein the unique identifier is included in a part of bits except for predetermined upper bits in the prefix, and the information representing whether the traffic is encoded is included in another part of bits from among the remaining bits.

4. The system of claim 1, wherein the received traffic is from a private network and the address converting module converts the restored private IP address to a public IP address and transmits the traffic through the internet.

5. The system of claim 1, wherein the received traffic is from the internet and the address converting module transmits the restored private IP address to a private network.

6. A method of operating the data loss prevention system implemented on a cloud, wherein the system comprises a data loss analyzing module for analyzing traffic according to a predetermined policy, examining whether personal information or confidential information is included and transmitting the examined traffic, the method comprising:
    converting a private IP address of a received traffic into an IPv6 address, which is unique in the data loss prevention system;
    decoding the received traffic and transmitting the decoded traffic to the data loss analyzing module when the received traffic is encoded, and intactly transmitting the received traffic to the data loss analyzing module when the received traffic is not encoded, by including information in the converted IPv6 address of the traffic to be transmitted to the data loss analyzing module representing whether the traffic is to be transmitted is the decoded traffic or the received intact traffic;
    analyzing, by the data loss analyzing module, the transmitted traffic transmitted according to a predetermined policy, examining whether personal information or confidential information is included and transmitting the examined traffic;
    encoding or not encoding the traffic transmitted from the data loss analyzing module according to the information representing whether the traffic is encoded included in the IPv6 address, by identifying the information included in the converted IPv6 address, encoding the traffic transmitted from the data loss analyzing module and transmitting the encoded traffic when the information in the converted IPv6 address represents that the traffic is the decoded traffic from the received encoded traffic, and transmitting intactly the traffic transmitted from the data loss analyzing module when the information in the converted IPv6 address represents that the traffic is the received intact traffic; and
    restoring the IPv6 address of the encoded or non-encoded traffic into the private IP address,
    wherein the unique IPv6 address comprises a unique identifier of a private network in which the private IP address is included, and the unique identifier and the information representing whether the traffic is encoded are included in a prefix of an IPv6 address space.

7. The method of claim 6, wherein the prefix corresponds to an upper 48 bit of the IPv6 address space.

8. The method of claim 6, wherein the unique identifier is included in a part of bits except for predetermined upper bits in the prefix, and the information representing whether the traffic is encoded is included in another part of bits from among the remaining bits.

9. The method of claim 6, wherein the received traffic is from a private, further comprising converting the restored private IP address to a public IP address and transmitting the traffic through the internet.

10. The method of claim 6, wherein the received traffic is from the internet, further comprising transmitting the restored private IP address to a private network.

* * * * *